April 6, 1937. H. H. HENRY 2,076,341
BATTERY TERMINAL
Filed June 9, 1932

Inventor:
Harry H. Henry,
By Dyrenforth, Lee, Chritton & Wiles,
Attorneys.

Patented Apr. 6, 1937

2,076,341

UNITED STATES PATENT OFFICE 2,076,341

BATTERY TERMINAL

Harry H. Henry, Chicago, Ill., assignor, by mesne assignments, to Battery Patents Corporation, Chicago, Ill., a corporation of Illinois Application June 9, 1932, Serial No. 616,310

1 Claim. (Cl. 136—168)

The invention relates to battery terminals, and has as its primary object the provision of improved terminals of the kind described.

A particular object of the invention is to provide a battery terminal which embodies improved means for preventing it from being driven through the wall of the battery when one hammers thereon.

Another particular object of the invention is to provide an improved terminal of the kind described which has improved means for preventing it from being angularly displaced around its longitudinal axis.

Battery terminals which embody the invention are adapted to hold the pasted grids or electrodes of the battery in their correct positions within the battery case. The terminals will not be displaced in the wall of the battery case when the terminal clamps of conductors are attached thereto.

Other objects and advantages will become apparent as the following detailed description progresses, reference being had to the accompanying drawing, wherein—

Fig. 5 is a section taken on line 5—5 of Fig. 3.

Fig. 7 is a section taken on line 7—7 of Fig. 6.

Figure 1:
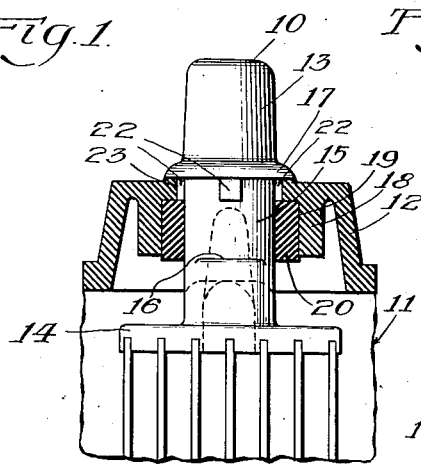
Fig. 1 is a fragmentary section taken through a battery which comprises a terminal embodying the invention.
Figure 2:
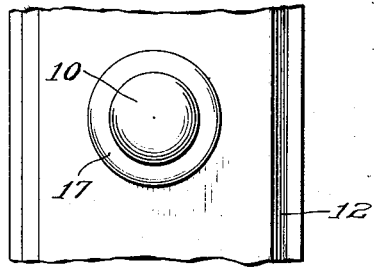
Fig. 2 is a plan view of the apparatus shown in Fig. 1.
Figure 4:
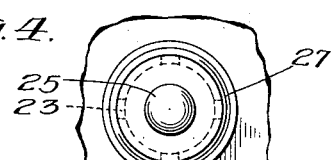
Fig. 4 is a plan view of the structure shown in Fig. 3.

Referring for the present to Figures 1 to 7, inclusive, wherein a preferred embodiment of the invention is illustrated, the reference character 10 designates generally a terminal of a battery 11 which comprises a top wall 12 formed from any suitable material. The terminal 10 comprises a head-portion 13 and a plate-portion 14 to which the pasted grids or electrodes are "burned". Formed integral with the plate-portion 14 is a shank portion 15 provided with a shoulder 16. At its upper end, the shank 15 is provided with an integral outwardly extending bead or flange 17 which co-operates with the shoulder 16 to hold the terminal 10 against displacement relative to the wall 12.

The wall 12 is provided with a downwardly extending flange 18 which forms a recess 19. Disposed in the recess 19 is a sleeve or tubular gasket 20 which is preferably formed from rubber, or the equivalent. The sleeve or tubular gasket 20 is preferably formed with an inside diameter which is less than the diameter of the shank 15 so that when the shank is assembled with the sleeve, the sleeve is compressed and forms a fluid-tight seal around the shanks.

The shank 15 is preferably provided with integral lugs 22 which engage notches 23 formed in the top wall 12. The lugs 22 prevent angular displacement of the terminal 10 around its vertical or longitudinal axis.

Figure 3:
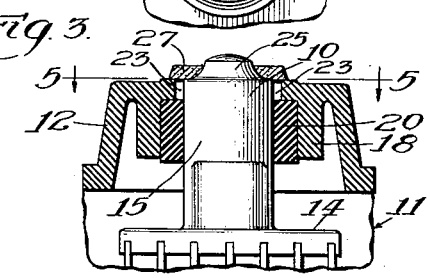
Fig. 3 is a fragmentary section illustrating one stage in the manufacture of the improved battery terminal shown in Fig. 1.

One method of producing the terminal 10 and assembling it with the top wall 12 of the battery is illustrated in Figs. 3 to 7, inclusive. Referring to Fig. 3, it will be noted that the terminal 10 in its first stage of manufacture is considerably shorter than it is in its final stage. It will be noted that the terminal 10 is first formed with an integral tapering projection 25 at its upper end which projects slightly above the top wall 12 when the terminal is forced through the sleeve or tubular gasket 20 from the bottom side of the top wall. After the shank 15 has been assembled with the top wall 12 in the manner illustrated in Fig. 3, the apertured member or collar 27 is seated on the upper end of the shank 15 in such manner that it encircles the projection 25. The collar 27 is preferably cast or formed from the same material as the shank 10 and will fuse at a relatively low temperature. It will be noted that the collar 27 is disposed above the notches 23.

Figure 6:
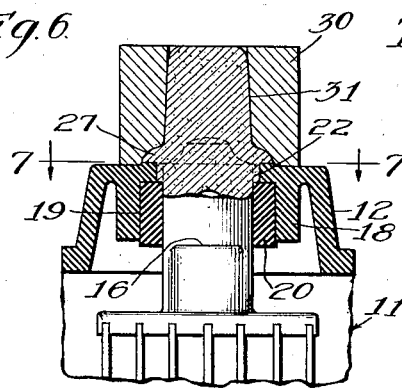
Fig. 6 is a fragmentary section illustrating another stage in the manufacture of the improved terminal shown in Fig. 1.

After the collar 27 has been assembled with the shank 15 as illustrated in Fig. 3, a mold member 30 is placed upon the top wall 12 as illustrated in Fig. 6. The mold member 30 comprises a mold cavity 31 which conforms to the shape of the upper end of the finished or completed terminal 10. After the mold has been positioned upon the top wall 12, the collar 27 and the top surface of the shank 15 are subjected to the heat of an oxyacetylene flame which fuses the collar and also the metal of the upper end of the shank. Part of the metal of the collar runs down into the notches 23 to form the lugs 22. Additional metal is then added to the shank by holding a bar of the proper metal over the mold member and subjecting it to the oxyacetylene flame so that the metal fuses and runs down into the mold cavity. The metal in the mold cavity is preferably subjected to the heat of the flame until the cavity has been filled. After the cavity has been filled, the mold member 30 is removed from the completed terminal. It is understood, of course, that the metal forming the upper end of the improved terminal is preferably the same as that employed in the manufacture of the shank portion. This metal fuses at a relatively low temperature.

When the terminal 10 is formed by practicing the method illustrated in Figs. 4 to 7, inclusive, the bead 17 is completely and neatly formed at the upper end of the shank portion 15. In other words, there is no failure of the fused metal to flow to all parts of the mold cavity 31.

It will be readily understood that if it is so desired, the notches 23 may be omitted from the wall 12, in which event, the metal of the collar 27 will not be employed to produce the lugs 22.

Figure 8:
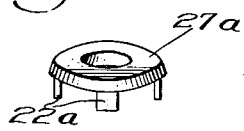
Fig. 8 is a perspective view of a cast member which embodies another form of the invention.

Fig. 8 illustrates another embodiment of the invention in which a collar 27a is shown, which collar 27a may be employed in place of the collar 27. The collar 27a is preferably formed of the same material as the collar 27. The collar 27a is provided with integral lugs 22a adapted to seat in the notches 23 when the collar 27a is assembled with the shank 15.

Figure 9:
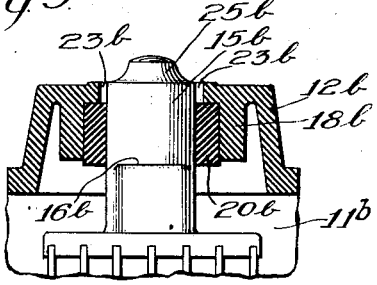
Fig. 9 is a fragmentary section taken through a battery to illustrate one stage in the manufacture of a terminal which embodies still another form of the invention.
Figure 10:
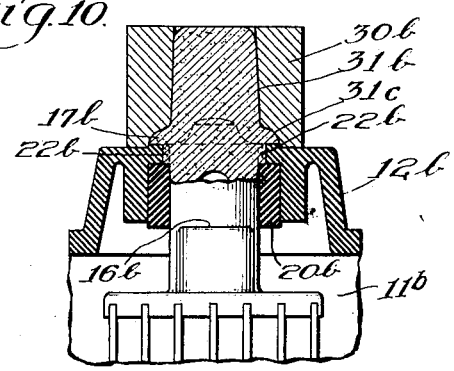
Fig. 10 is a section which illustrates a later stage in the manufacture of the terminal shown in Fig. 9.

Figs. 9 and 10 illustrate another embodiment of the invention. Referring first to Fig. 9, wherein a shank 15b substantially identical in construction with the shank 15 shown in Fig. 3 is assembled with the top wall 12b of a battery 11b, the top wall 12b being identical with the top wall 12 shown in Figs. 1 to 7, inclusive. Thus, the top wall 12b is provided with notches 23b and a downwardly extending flange 18b. The shank portion 15b projects through a sleeve or tubular gasket 20b preferably formed of rubber, or the equivalent. The shank 15b is formed with a shoulder 16b engageable with the lower end of the sleeve 20b. At its upper end, the shank 15b is provided with an integral tapering projection 25b which is identical with the projection 25 described above.

After the shank 15b has been assembled with the top wall 12b as illustrated in Fig. 9, a mold member 30b is placed upon the top wall 12b as illustrated in Fig. 10. The mold member 30b is provided with a mold cavity substantially identical with the mold cavity 31 described above. The upper end of the shank portion 15b is then subjected to the heat of an oxyacetylene flame to fuse it after which additional metal is added in the manner described above in connection with the mold 30. It will be noted that the mold cavity 31b is provided with an annular groove 31c at its lower end to form a bead 17b identical with the bead 17 shown in Fig. 1. It is understood, of course, that the fused metal flows into the notches 23b to form the lugs 22b which are identical with the lugs 22 described above.

If it is so desired, the notches 23b may be omitted from the wall 12b.

A feature of the invention is that the beads 17 and 17b prevent the improved terminal from being driven through the top wall of the battery when a conductor is being clamped thereto. Another advantage of the improved construction is that the lugs 22 and 22b prevent the terminal from being angularly displaced around its vertical or longitudinal axis. Such displacement would, of course, displace the pasted grids or electrodes in the battery case.

The beads 17 and 17b may be said to provide shoulders which co-operate with the shoulder 16 and the corresponding shoulder 16b on the shank 15b to prevent displacement of the shanks through the holes of the top walls. Unless otherwise indicated, the sleeves 20 and 20b will be considered, in the appended claim, as parts of the top walls of the batteries.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as possible in view of the prior art.

I claim:

In a storage battery, the combination with a battery case having a top wall apertured to receive a terminal post of said battery and provided with a depending annular flange providing a socket below said aperture, said socket being of uniform diameter therethrough and being of greater diameter than said aperture, said top wall extending over a portion of said socket, a tubular resilient sleeve tightly received within said socket and extending below said socket, and a terminal of uniform diameter and of substantially greater diameter than the sleeve projecting through said apertured top wall and also through said sleeve so as to tightly expand said sleeve against said annular flange, said terminal having an integral flange engaging the top surface of said wall which extends over said socket, said terminal having also an integral shoulder engaging solely the bottom wall of said depending tubular sleeve, said second mentioned flange providing with said terminal a diameter greater than the diameter of said aperture in said top wall and pressing against the bottom portion of said resilient sleeve so as to draw the upper integral flange of said terminal tightly against the top portion of the wall directly over said resilient sleeve.

HARRY H. HENRY.